United States Patent [19]

Kohavi et al.

[11] Patent Number: 6,026,399

[45] Date of Patent: Feb. 15, 2000

[54] SYSTEM AND METHOD FOR SELECTION OF IMPORTANT ATTRIBUTES

[75] Inventors: Ron Kohavi, Mountain View; Daniel A. Sommerfield, San Mateo, both of Calif.

[73] Assignee: Silicon Graphics, Inc., Mountain View, Calif.

[21] Appl. No.: 08/866,314

[22] Filed: May 30, 1997

[51] Int. Cl.[7] .................................................. G06F 17/30
[52] U.S. Cl. .................... 707/6; 707/2; 707/3; 707/5; 707/7
[58] Field of Search .................. 707/2, 3, 5, 6, 707/7

[56] References Cited

U.S. PATENT DOCUMENTS

| | | | |
|---|---|---|---|
| 3,816,726 | 6/1974 | Sutherland et al. | 235/152 |
| 4,719,571 | 1/1988 | Rissanen et al. | 364/300 |
| 4,868,771 | 9/1989 | Quick et al. | 364/578 |
| 4,928,247 | 5/1990 | Doyle et al. | 364/518 |
| 4,994,989 | 2/1991 | Usami et al. | 364/522 |
| 5,043,920 | 8/1991 | Malm et al. | 364/521 |
| 5,072,395 | 12/1991 | Bliss et al. | 364/443 |
| 5,150,457 | 9/1992 | Behm et al. | 395/120 |
| 5,164,904 | 11/1992 | Sumner | 364/436 |
| 5,201,047 | 4/1993 | Maki et al. | 395/600 |
| 5,247,666 | 9/1993 | Buckwold | 707/6 |
| 5,251,131 | 10/1993 | Masand et al. | 364/419.08 |

(List continued on next page.)

OTHER PUBLICATIONS

Amsbury, W., *Data Structures from Arrays to Priority Queues*, Wadsworth Publishing, Belmont, CA, pp. viii and 331–336, Copyright 1985.

Date et al., *A Guide to SQL/DS*, Addison–Wesley Publishing, New York, NY, pp. xiii and 97–118, Copyright 1989.

Hecht–Nielsen, R., *Neurocomputing*, Addison–Wesley Publishing, New York, NY, pp. ix–xiii and 175–201, Copyright 1990.

Hsiao et al., "Supervised Textured Image Segmentation Using Feature Smoothing and Probabilistic Relaxation Techniques," *IEEE Transactions on Pattern Analysis and Machine Intelligence*, vol. 11, No. 12, pp. 1279–1292, Dec. 1989.

Robert et al., "Continuously Evolving Classification of Signals Corrupted by an Abrupt Change," *IEEE—IMS Workshop on Information Theory and Statistics*, p. 97, Oct. 1994.

Santos–Victor et al., "A Computer Vision System for the Characterization and Classification of Flames in Glass Furnaces," *IEEE Transactions on Industry Applications*, vol. 29, No. 3, pp. 470–478, May/Jun. 1993.

Taxt et al., "Segmentation of Document Images," *IEEE Transactions on Pattern Analysis and Machine Intelligence*, vol. 11, No. 12, pp. 1322–1329, Dec. 1989.

Ahlberg et al., "IVEE: An Information Visualization & Exploration Environment," Proceedings of Information Visualization '95, 1995, pp. 66–73.

(List continued on next page.)

*Primary Examiner*—Paul V. Kulik
*Assistant Examiner*—Jean R. Homere
*Attorney, Agent, or Firm*—Sterne, Kessler, Goldstein & Fox, P.L.L.C.

[57] ABSTRACT

A system and method determines how well various attributes in a record discriminate different values of a chosen label attribute. An attribute is considered a relevant attribute if it discriminates different values of a chosen label attribute either alone or in conjunction with other attributes. According to the present invention, a label attribute is selected by a user from a set of records, with each record having a plurality of attributes. Next, one or more first important attributes considered important by the user are selected. The present invention then generates one or more second important attributes. The second important attributes together with the user chosen first important attributes discriminate well between different values of the label attribute. A measure called "purity" (a number from 0 to 100) informs how well each attribute discriminates the different label attributes. The purity measure allows the attributes to be ranked based on their importance.

30 Claims, 5 Drawing Sheets

U.S. PATENT DOCUMENTS

| | | | |
|---|---|---|---|
| 5,253,333 | 10/1993 | Abe | 395/62 |
| 5,282,262 | 1/1994 | Kurashige | 395/126 |
| 5,295,243 | 3/1994 | Robertson et al. | 395/160 |
| 5,307,456 | 4/1994 | MacKay | 395/154 |
| 5,325,445 | 6/1994 | Herbert | 382/38 |
| 5,418,946 | 5/1995 | Mori | 395/600 |
| 5,420,968 | 5/1995 | Johri | 395/133 |
| 5,426,780 | 6/1995 | Gerull et al. | 395/600 |
| 5,459,829 | 10/1995 | Doi et al. | 395/152 |
| 5,463,773 | 10/1995 | Sakakibara et al. | 395/600 |
| 5,519,865 | 5/1996 | Kondo et al. | 395/600 |
| 5,528,735 | 6/1996 | Strasnick et al. | 395/127 |
| 5,553,163 | 9/1996 | Nivelle | 382/227 |
| 5,555,354 | 9/1996 | Strasnick et al. | 395/127 |
| 5,604,821 | 2/1997 | Ranganathan et al. | 382/236 |
| 5,634,087 | 5/1997 | Mammone et al. | 395/24 |
| 5,659,731 | 8/1997 | Gustafson | 707/4 |
| 5,671,333 | 9/1997 | Catlett et al. | 395/20 |
| 5,675,711 | 10/1997 | Kephart et al. | 395/22 |
| 5,675,785 | 10/1997 | Hall et al. | 395/613 |
| 5,675,786 | 10/1997 | McKee et al. | 395/614 |
| 5,680,476 | 10/1997 | Schmidt et al. | 382/159 |
| 5,694,524 | 12/1997 | Evans | 395/77 |
| 5,696,964 | 12/1997 | Cox et al. | 395/605 |
| 5,706,495 | 1/1998 | Chadha et al. | 395/602 |
| 5,724,573 | 3/1998 | Agrawal et al. | 707/6 |
| 5,727,199 | 3/1998 | Chen et al. | 707/6 |
| 5,732,230 | 3/1998 | Cullen et al. | 395/339 |
| 5,737,487 | 4/1998 | Bellegarda et al. | 395/25.9 |
| 5,748,852 | 5/1998 | Mahler | 395/61 |
| 5,787,274 | 7/1998 | Agrawal et al. | 707/102 |

OTHER PUBLICATIONS

Becker et al., "Smooth Transitions between Bump Rendering Algorithms," *Computer Graphics Proceedings*, Annual Conference Series, 1993, pp. 183–190.

Becker et al., "Unsteady Flow Volumes," *Proceedings of Visualization '95*, pp. 329–335.

Blinn, James F., "Light Reflection Functions for Simulation of Clouds and Dusty Surfaces," *Computer Graphics*, vol. 16, No. 3, Jul. 1982, pp. 116–124.

Crawfis et al., "Texture Splats for 3D Scalar and Vector Field Visualization," *Proceedings of IEEE Visualization '93*, 1993, pp. 261–265.

Crawfis et al., "Vector Field Visualization," *Computer Graphics and Applications*, vol. 14, 1994, pp. 50–56.

Inselberg et al., "Parallel Coordinates: A Tool for Visualizating Multidimensional Geometry," *Proceedings of Visualization '90*, pp. 361–378.

Laur et al., "Hierarchical Splatting: A Progressive Refinement Algorithm for Volume Rendering," *Computer Graphics*, vol. 25, No. 4, Jul. 1991, pp. 285–288.

Levoy, Marc, "Volume Rendering: Display of Surfaces from Volume Data," *IEEE Computer Graphics and Applications*, vol. 8, No. 5, May 1988, pp. 29–37.

Martin et al., "High Dimensional Brushing for Interactive Exploration of Multivariate Data," *Proceedings of Visualization '95*, 1995, pp. 271–278.

Max et al., "Bump Shading for Volume Textures," *IEEE Computer Graphics and Applications*, Jul. 1994, pp. 18–20.

Max et al., "Flow Volumes for Interactive Vector Field Visualization," *Proceedings of Visualization '93*, 1993, pp. 19–24.

Sabella, Paolo, "A Rendering Algorithm for VIsualizing 3D Scalar Fields," *Computer Graphics*, vol. 22, No. 4, Aug. 1988, pp. 51–58.

Stein et al., "Sorting and Hardware Assisted Rendering for Volume Visualization," *IEEE*, 1995, pp. 83–89.

Van Wijk et al., "HyperSlice," *Proceedings of Visualization '93*, 1993, pp. 119–125.

Westover, Lee, "Footprint Evaluation for Volume Rendering," *Computer Graphics*, vol. 24, No. 4, Aug. 1990, pp. 367–376.

Wilhelms et al., "A Coherent Projection Approach for Direct Volume Rendering," *Computer Graphics*, vol. 25, No. 4, Jul. 1991, pp. 275–284.

Wong et al., "Dual Multiresolution HyperSlice for Multivariate Data Visualization," *IEEE Symposium on Information Visualization*, Oct. 1996, pp. 74–75.

Aha, D.W. et al., "Instance–Based Learning Algorithms," *Machine Learning*, vol. 6, No. 1, pp. 37–66 (Jan. 1991).

Almuallim, H. and Dietterich, T.G., "Learning Boolean Concepts in the Presence of Many Irrelevant Features," *Artificial Intelligence*, vol. 69, Nos. 1–2, pp. 279–305 (Sep. 1994).

"Angoss Software Announces Knowledge Studio Data Mining Solution," http://www.pathfinder.com/@@xIEkOgYAVjbJZjKM/money/latest/press/PW/19970ct27/92, Angoss Software Corporation, pp. 1–2, Oct. 1997.

"Angoss Software's KnowledgeSeeker(™) Compatible With SAS Institute," http://www.newswire.ca/releases/September.1997/18/c3915.html. pp. 1–2, Canada Newswire, Sep. 1997.

Breiman et al., *Classification and Regression Trees*, Wadsworth International Group, entire book (1984).

Cestnik, B., "Estimating Probabilities: A Crucial Task in Machine Learning," *Proceedings of the 9th European Conference on Artificial Intelligence*, pp. 147–149 (Aug. 1990).

"Companies in Data Mining and Knowledge Discovery," http://kdnuggets.com/companies.html. pp. 1–4, Last updated: Oct. 31, 1997.

Cormen, T.H., et al., *Introduction to Algorithms*, The MIT Press, pp. 263–280 (1990).

Cover and Thomas, *Elements of Information Theory*, Wiley Interscience, entire book, 1991.

Dasarathy, B.V., "Nearest Neighbor (NN) Norms: (NN) Patterns Classification Techniques," (IBL), *IEEE Computer Society Press*, pp. 1–30 (1990).

"Data Mining and Knowledge Discovery References," http://kdnuggets.com/references.html, pp. 1–3, Last updated: Oct. 29, 1997.

Domingos, P. and Pazzani, M., "Beyond Independence: Conditions for the Optimality of the Simple Bayesian Classifier," *Machine Learning: Proceedings of the 13th International Conference* (ICML '96), pp. 105–112 (1996).

Duda, R. and Hart, P., *Pattern Classification and Scene Analysis*, Wiley, entire book, (1973).

Fairchild, K.M., "Information Management Using Virtual Reality–Based Visualizations," *Virtual Reality Applications and Explorations*, ed. A. Wexelblat, Academic Press, Inc., pp. 45–74, Copyright (1993), Publication date Jul. 1, 1993.

Fisher, R.A., "The use of multiple measurements in taxonomic problems," *Annals of Eugenics*, vol. 7., No. 1, pp. 179–188 (1936).

Friedman, J. H. et al., "Lazy Decision Trees," *Proceedings of the Thirteenth National Conference on Artificial Intelligence*, AAAI Press and the MIT Press, vol. 1, pp. 717–724 (1996).

Good, I.J., *The Estimation of Probabilities: An Essay on Modern Bayesian Methods*, pp. xi–xii, MIT Press, pp. 1–79, (1965).

"IBM Digs Deep for Data Mining 'Gold'," http://www.software.ibm.com/data/intellimine/factsheet.html, pp. 1–8, IBM Corporation, Copyright 1997.

"KD Mine: Data Mining and Knowledge Discovery," http://kdnuggets.com/index_kdm.html, p. 1, Knowledge Discovery Nuggets, Copyright 1997, Last updated: Oct. 31, 1997.

Kittler, J., "Feature Selection and Extraction," *Handbook of Pattern Recognition and Image Processing*, Chapter 3, pp. 59–83, Academic Press, Inc., 1986.

Knuth, A., *The Art of Computer Programming*, Addison–Wesley, vol. 2, pp. 506–550 (1973).

Kohavi, R., "Scaling Up the Accuracy of Naive–Bayes Classifiers: a Decision–Tree Hybrid," In *Data Mining and Visulaization*, Silicon Graphics, Inc., from The Second International Conference on Knowledge Discovery and Data Mining (1996).

Kohavi, R., "A Study of Cross–Validation and Bootstrap for Accuracy Estimation and Model Selection," *Proceedings of the 14th International Joint Conference on Artifical Intelligence*, Stanford University, 1995.

Kohavi, R. and John, G., "Wrappers for Feature Subset Selection," http://robotics.stanford.edu/~{ronnyk,gjohn}, May 20, 1997.

Kohavi, R. and Li, C., "Oblivious Decision Trees, Graphs, and Top–Down Pruning," *Proceedings of the 14th International Joint Conference on Artificial Intelligence*, Chriss S. Mellish (Ed.), Morgan Kaufmann Publishers, Inc., pp. 1071–1077 (1995).

Kohavi, R. and Sommerfield, D., "Feature Subset Selection Using the Wrapper Model: Overfitting and Dynamic Search Space Topology," *Proceedings of the First International Conference on Knowledge Discovery and Data Mining*, pp. 192–197 (Aug. 1995).

Kohavi, R. et al., "Data Mining using MLC++: A Machine Learning Library in C++," *Tools With AI*, pp. 234–245 (1996).

Kononenko, I., "Inductive and Bayesian Learning in Medical Diagnosis," *Applied Artificial Intelligence*, vol. 7, pp. 317–337 (1993).

Langley, P. and Sage, S., "Induction of Selective Bayesian Classifiers," *Proceedings of the Tenth Conference on Uncertainty in Artificial Intelligence*, Morgan Kaufmann Publishers, Inc., pp. 399–406 (Jul. 1994).

Langley, P. and Sage, S., "Oblivious Decision Trees and Abstract Cases," *Working Notes of the AAAI–94 Workshop on Case–Based Reasoning*, AAAI Press, pp. 113–117 (1994).

Langley, P., et al., "An Analysis of Bayesian Classifiers," *Proceedings of the Tenth National Conference on Artificial Intelligence*, pp. 223–228 (Jul. 1992).

Lincoff, G., *National Audubon Society Field Guide to North American Mushrooms*, New York, pp. 9–32, (1981).

Mangasarian, O. L. and Wolberg, W. H., "Cancer Diagnosis Via Linear Programming," *SIAM News*, vol. 23, No. 5, pp. 1&18 (Sep. 1990).

Michie, et al., *Machine Learning, Neural and Statistical Classification*, Ellis Norwood United, entire book, (1994).

Murthy, S. et al., "Randomized induction of oblique decision trees," *Proceedings of the Eleventh National Conference on Artificial Intelligence*, AAI Press/MIT Press, pp. 322–327 (1993).

"Other Web Sites for Data Mining and Knowledge Discovery," http://kdnuggets.com/websites.html, pp. 1–3, Last updated: Sep. 10, 1997.

Quinlan, J.R., *C4.5: Programs for Machine Learning*, Morgan Kaufmann Publishers, Inc., pp. 17–26 (1993).

Quinlan, J.R., "Induction of Decision Trees," *Machine Learning*, vol. 1, No. 1,pp. 81–106 (1986).

Rendell, L. and Seshu, R., "Learning hard concepts through constructive induction: framework and rationale," *Computational Intelligence*, vol. 6, No. 4, pp. 247–270 (Nov. 1990).

"SAS Data Mining Solution," http://www.sas.com/software/data_/mining/whitepapers/solution.html, pp. 1–6, SAS Institute Inc., Copyright 1997, Last Updated Sep. 26, 1997.

Schaffer, C., "A Conservation Law for Generalization Performance," *Machine Learning: Proceedings of the Eleventh International Conference*, Morgan Kaufmann Publishers, Inc., pp. 259–265 (1994).

Shavlik, J.W. and Dietterich, T.G. (Eds.), *Readings in Machine Learning*, Morgan Kaufmann Publishers, Inc., entire book, (1990).

"S*i*ftware: Tools for Data Mining and Knowledge Discovery," http://kdnuggets.com/siftware.html, pp. 1–2, Last updated: Oct. 31, 1997.

Thrun et al., "The Monk's Problems: A Performance Comparison of Different Learning Algorithms," *Technical Report CMU–CS–91–197*, Carnegie Mellon University pp. i–x and 1–112, (1991).

Utgoff, P., "Perceptron Trees: A Case Study in Hybrid Concept Representation," *Proceedings of the Seventh National Conference on Artificial Intelligence*, Morgan Kaufmann, vol. 2, pp. 601–606 (Aug. 1988).

Weiss, S.M. and Kulikowski, C.A., *Computer Systems That Learn: Classification and Prediction Methods from Statistics, Neural Nets, Machine Learning, and Expert Systems*, Morgan Kaufmann Publishers, Inc., entire book, (1991).

MineSet User's Guide, Silicon Graphics Computer Systems, 1996, made available to public less than one year prior to May 30, 1997.

Greenwood, J., "Countdown to the Cybermarket," Financial Post Magazine, Mar., 1994, pp. 26–32.

Boyl, J. et al., "Design of a 3D user interface to a database," submitted to Database Issues for Data Visualization Workshop, Jul., 1993, pp. 1–9.

Gershon, N. et al., "Visualization's New Tack: Making Sense of Information," IEEE Spectrum, Nov., 1995, pp. 38–47 and 55.

"Mineset Awards," http://www.sgi.com/Products/software/MineSet/awards.html, p. 1, (Jan. 9, 1998).

"Silicon Graphics MineSet Wins Bronze Miner Award," http://www.sgi.com/Headlines/1997/October/mineset$_{13}$ release.html, pp. 1–2, (Oct. 1, 1997).

"The 1997 Database Dozen," by D. Stodder, http://www.db-pd.com/96dozen.htm, pp. 1–2, (1996 or 1997).

"A Dozen Companies on the Rise," http://www.dbpd.com/seconddz.htm, pp. 1–9, (Miller Freeman Inc. 1997).

"MineSet 2.0 for Data Mining and Multidimensional Data Analysis," by C. Hall, http://www.sgi.com/Products/software/MineSet/DMStrategies/, pp. 1–12, (1997). (originally appeared in Sep. 1997 issue of *Data Management Strategies*, Copyright 1997 Cutter Information Corp.).

Carlbom et al., "A Hierarchical Data Structure for Representing the Spatial Decomposition of 3–D Objects", *IEEE Computer Graphics & Applications*, Apr. 1985, pp. 24–31.

Carlbom et al., "Planar Geometric Projections and Viewing Transformations" *Computing Surveys*, vol. 10, No. 4, Dec. 1978, pp. 465–502.

Beveaux, T., "Virtual Reality Gets Real", *New Media*, (Jan. 1993), pp. 32–35.

Graves, G.L., "NASA's Virtual Reality", *New Media*, (Jan. 1993), pp. 36–38.

Graves, G.L., "Invasion of the Digital Puppets", *New Media*, (Jan. 1993), pp. 38–40.

Yavelow, C., "3–D Sound Found In Space", *New Media*, (Jan. 1993), pp. 40–41.

Johnson, Brian and Ben Shneiderman, "Tree–Maps: A Space–Filling Approach to the Visualization of Hierarchical Information Structures", *IEEE Visualization Proceedings '91*, Oct. 1991, pp. 284–291.

Structural Dynamics Research Corporation News Release, "SDRC Announces Software Translator Between CADAM and I–DEAS", Mar. 31, 1992.

Jacobson, Bob, "The Ultimate User Interface", *Byte*, Apr. 1992, pp. 175–182.

Clarkson, Mark A., "An Easier Interface", *Byte*, Feb. 1991, pp. 277–282.

Radding, Alan, "PC GIS: Expect Gain But Also Some Pain", *Computerworld*, Feb. 17, 1992, p. 89.

Hilderbrand, Carol, "GIS Vital In Utility's Duel with Competitor", *Computerworld*, Jan. 20, 1992, p. 43.

Anthes, G.H., "GIS Eases Redistricting Worry", *Computerworld*, Oct. 7, 1991, p. 65.

Alexander, Michael, "GIS Sprouting Corporate Wings", *Computerworld*, Jul. 22, 1991, p. 20.

Wilder, C., "Virtual Reality Seeks Practicality", *Computerworld 26* (*17*), Apr. 27, 1992, p. 26.

Fairchild, Kim M., Steven E. Poltrock and George W. Furnas, "SemNet: Three–Dimensional Graphic Representations of Large Knowledge Bases", *Cognitive Science and its Applications for Human–Computer Interaction*, Guindon, Ed., 1988, pp. 201–233.

*Precision Visuals International Limited*, "Summary of PV–Wave Point & Click Visual Data Analysis Software", 1991.

Flanagan, William G., "Cyberspace Meets Wall Street", *Forbes*, Jun. 22, 1992, pp. 164–168.

Grinstein, G. et al., "Visualization for Knowledge Discovery", *Intl. J. Intelligent Systems 7*, 1992, pp. 637–648.

Fuller, J.E., Using Autocad, 3d Ed., Chapter 17, *Viewing 3–D Drawings*, 1989, pp. 17–1–17–14, and Tutorial, pp. 19–15–19–16, Delmar Publishers, Inc., Albany, NY 12212.

Alexander, M., "Visualizing Cleared–Off Desktops", *Computerworld 25* (*18*), May 6, 1991, p. 20.

Benedikt, M., ed., *Cyberspace First Steps*, The MIT Press, Cambridge, Massachusetts (1992), pp. 1–436.

Forrest, D., "Seeing Data in New Ways", *Computerworld*, Jun. 29, 1992, pp. 85–86.

Newquist, H.P., "Virtual Reality's Commercial Reality", *Computerworld 26* (*3*), pp. 93–95; 1992.

"Atlas Software: A New Dimension in Data Management", advertisement, Atlas Software, Strategic Mapping, Inc., San Jose, CA 95117 (page and date unknown).

"News: What's New—Business Software", *Byte*, Mar. 1992, p. 78.

"A Map for All Reasons", advertisement, Strategic Mapping, Inc., San Jose, CA 95117 (page and date unknown).

News Release, Company: Information Builders, Dateline: Pacific Palisades, CA, "Remarkable 3D Main–Frame Graphics Available For PC Users", Feb. 1985.

News Release, Company: Information Builders, Inc., Dateline: Palm Desert, CA, "Information Builders Announces Release 3.0 of PC/Focus DBMS", Jun. 1, 1987.

News Release, Company: Honeywell Bull, Dateline: Bilerica, MA "Relational Software System Increases Integration, Productivity for Honeywell Bull Users", Jul. 17, 1987.

News Release, Company: Alliant Computer Systems, Dateline: San Diego, CA, "TGS' Figaro To Be Marketed With Silicon Graphics", Jul. 8, 1988.

News Release, Company: Alliant Computer Systems, Dateline: Atlanta, GA, "Alliant Debuts New Class of System The Visual Supercomputer", Aug. 2, 1988.

News Release, Company: Virtus, Dateline: Pleasanton, CA, "Individual Software Introduces Training for Microsoft Excel 3.0 Windows and Macintosh Versions", Jul. 31, 1991.

News Release, Company: Virtus Corporation, Dateline: Cary, NC, "Virtus Walkthrough Releases Quicktime Component", Nov. 1, 1991.

News Release, Company: Alias Research, Dateline: Toronto, Ontario, "Alias Ships Sketch!, Freeform 3D Illustration and Design Program", Nov. 15, 1991.

News Release, Company: Structural Dynamics Res. Intl. Business Machines, Dateline: Boston MA, "Alias Sketch (TM) Resumes Shipping: Freeform 3D Illustration and Design Tool", Feb. 19, 1992.

Pollack, A., "The 2–D Screen Gives 3–D World" New York Times (date unknown).

Foley et al., "Computer Graphics: Principals and Practice", Second Edition, Addison–Wesley Publishing Co., 1990, pp. 731–734 and color plate III.23.

SYSTEM AND METHOD FOR SELECTION OF IMPORTANT ATTRIBUTES

BACKGROUND OF THE INVENTION

1. Field of the Invention

The present invention relates generally to data mining and, more specifically, to a system and a method for selecting important attributes in a database.

2. Related Art

In many applications, it is desirable to identify the important factors contributing to a phenomenon. The ability to identify important factors that contribute to a phenomenon either directly or in conjunction with other factors is immensely valuable.

Specifically, in visual data mining, humans view the data in different graphical ways (e.g., scatterplots). When there are many attributes or features (attributes and features are used interchangeably hereinafter) in a record, it is not clear which axes to plot. A system that can decide for users the important attributes to assign to the axes for a given goal is very valuable.

In data mining applications, a problem often faced by an induction method (also called induction algorithm) is how to focus its attention to relevant attributes when there is a predetermined label attribute. This is also known as attribute selection or feature selection. It is well known that induction methods degrade in their prediction accuracy when extraneous variables are presented. In other words, when an induction method is faced with many attributes that are not necessary for predicting the desired label attribute, prediction accuracy decreases.

Practical machine learning algorithms, including top-down induction of decision tree algorithms such as ID3 ("Induction of Decision Trees," J. R. Quinlan, Machine Learning, vol. 1, 1986), C4.5 (C4.5: Programs for Machine Learning, J. R. Quinlan, 1993), CART (Classification and Regression Trees, L. Breiman, J. H. Friedman, R. A. Olshen and C. Stone, 1984), and instance based algorithms, such as IBL ("Nearest Neighbor (NN) Norms: (NN) Patterns Classification Techniques," B. V. Dasarathy, IEEE Computer Society Press, 1990), ("Instance-Based Learning Algorithms," Machine Learning, D. W. Aha, D. Kibler and M. K. Albert, vol. 6, 1991), are known to degrade in performance (e.g., prediction accuracy) when faced with many attributes that are not necessary for predicting the desired output. This problem was also discussed in "Learning Boolean Concepts in the Presence of Many Irrelevant Features," Artificial Intelligence, H. Almuallim and T. G. Dietterich, vol. 69, 1994.

For example, running C4.5 in default mode on the Monk 1 problem (Thrun et al. 1991), which has three irrelevant attributes, generates a tree with 15 interior nodes, five of which test irrelevant attributes. The generated tree has an error rate of 24.3%, which is reduced to 11.1% if only the three relevant attributes are given. Aha (1991) noted that "IB3's storage requirement increases exponentially with the number of irrelevant attributes" (IB3 is a nearest-neighbor algorithm that attempts to save only important prototypes). Likewise, IB3's performance degrades rapidly with irrelevant features.

Simply stated, the problem of attribute selection is that of finding a subset of the original attributes, such that a training set that is run on data containing only those attributes generates a classifier with the highest possible accuracy. Note that attribute selection chooses a subset of attributes from existing attributes, and does not construct new attributes. Thus, there is no attribute extraction or construction (Kittler 1986, Rendell & Seshu 1990).

Consider a database of cars where each record has the following attributes:

mpg
cylinders
horsepower
weight
time_zero_to_sixty
year
brand
origin

Suppose, "origin" is selected as the chosen label attribute. We would like to know the importance of the remaining attributes with respect to the chosen label attribute (the remaining attributes are dependent variables of the chosen label attribute). In other words, we would like to know how well the remaining attributes discriminate the chosen label attribute. For example, the attribute "year" does not discriminate the label attribute "origin" well, i.e., the year of make of an automobile does not predict its country of origin. Thus, "year" is not an important attribute for the label attribute "origin." On the other hand, the attribute "brand" discriminates the label attribute "origin" quite well, i.e., the brand of an automobile correlates well with the country of origin. Thus, "brand" is an important attribute.

Furthermore, it would be desirable to identify the best three (or any other number) attributes for discriminating the label attribute. For example, given the label attribute "origin", it would be desirable to identify the best three attributes from the remaining attributes that discriminate the label attribute. Finally, it would be desirable to rank the remaining attributes based on how well they discriminate the label attribute.

In a Naive-Bayes classifier, the importance of each attribute is computed independently. However, if the importance of attributes is computed independently, then correlations are not properly captured. This is not desirable in databases that have several attributes that are correlated. For example, suppose that, in a database of computers, each record has several attributes, such as price, performance, etc. Suppose, the price of a computer is an important indicator of its performance. In other words, if the performance of a computer is a chosen label attribute, the price of a computer is an important attribute that discriminates the chosen label attribute well. Also, suppose among the several attributes, that there are three attributes, each indicative of price, and are essentially important and correlated: U.S. Dollar, Israeli Shekel and French Franc. While Dollar might be a good attribute individually, it is not as important together with Shekel and Franc because they are highly correlated. Thus, the best set of three attributes is not necessarily composed of the attributes that rank highest individually. If two attributes give the price in Dollar and in Shekel, they are ranked equally alone; however, if one of them is chosen, the other adds no discriminatory power to the set of best attributes. In Naive-Bayes, these three attributes will be selected first because they are equally important. However, since they are essentially equivalent, they do not provide any additional information. Thus, Naive-Bayes does not perform satisfactorily when there are correlated attributes.

Although many statistical measures for attribute selection exist, most are limited to either numeric or discrete attributes but not both, while others are based on strong distribution assumptions. Many real databases contain categorical attributes (e.g., state, eye-color, hair-color), and distribution assumptions may not be easily specified.

A feature selection method was described by the inventors of this application in "Feature Subset Selection Using the Wrapper Method: Overfitting and Dynamic Search Space Topology," R. Kohavi and D. Sommerfield, First International Conference on Knowledge Discovery and Data Mining (1995). The wrapper method, however, does not allow user interaction and users cannot influence the choice. Moreover, the wrapper method is very slow. As discussed in the paper, it required 29 hours of execution time to find the most important attributes in a DNA dataset. Furthermore, mutual information is not utilized to identify important features.

As a result, there is a need for a system and a method for determining how well various attributes in a record discriminate different values of a chosen label. There is also a need for a system and a method to enable data mining systems to focus on relevant attributes while ignoring the irrelevant attributes.

SUMMARY OF THE INVENTION

The present invention provides a system and a method for determining the important attributes that discriminate between different values of a chosen label attribute in a database.

According to the present invention, a set of labeled records are received. Next, an oblivious decision tree (ODT) for classifying records is constructed. The construction of ODT is performed using mutual information criteria. The mutual information criteria are used to select attributes conditioned on the previous ones. The mutual information criteria includes a numerical value that indicates how well each attribute discriminates a chosen label attribute.

According to the present invention, a label attribute is selected from a set of records where each record has a plurality of attributes. Next, one or more first attributes that the user considers important are chosen. The present invention then generates one or more second important attributes. The second important attributes together with the user-chosen, first important attributes discriminate between the different values of the label attribute.

Next, the non-cumulative purity of each first and second important attribute is determined. The non-cumulative purity indicates how well each important attribute individually discriminates between the different values of the label attribute. Next, the cumulative purity of each important attribute is determined. The cumulative purity indicates how well each important attribute in combination with all other important attributes discriminate between the different values of the label attribute. The purity is measured by a number from 0 to 100, 0 indicating lowest purity and 100 indicating highest purity. Finally, each second important attribute is ranked based on its purity.

Further features and advantages of the present invention, as well as the structure and operation of various embodiments of the invention, are described in detail below with reference to the accompanying drawings.

BRIEF DESCRIPTION OF THE DRAWINGS

The present invention will be described with reference to the accompanying drawings, wherein.

In the drawings, like reference numbers generally indicate identical, functionally similar, and/or structurally similar elements. The drawing in which an element first appears is indicated by the leftmost digit(s) in the reference number.

DETAILED DESCRIPTION OF THE PREFERRED EMBODIMENT

Figure 1:
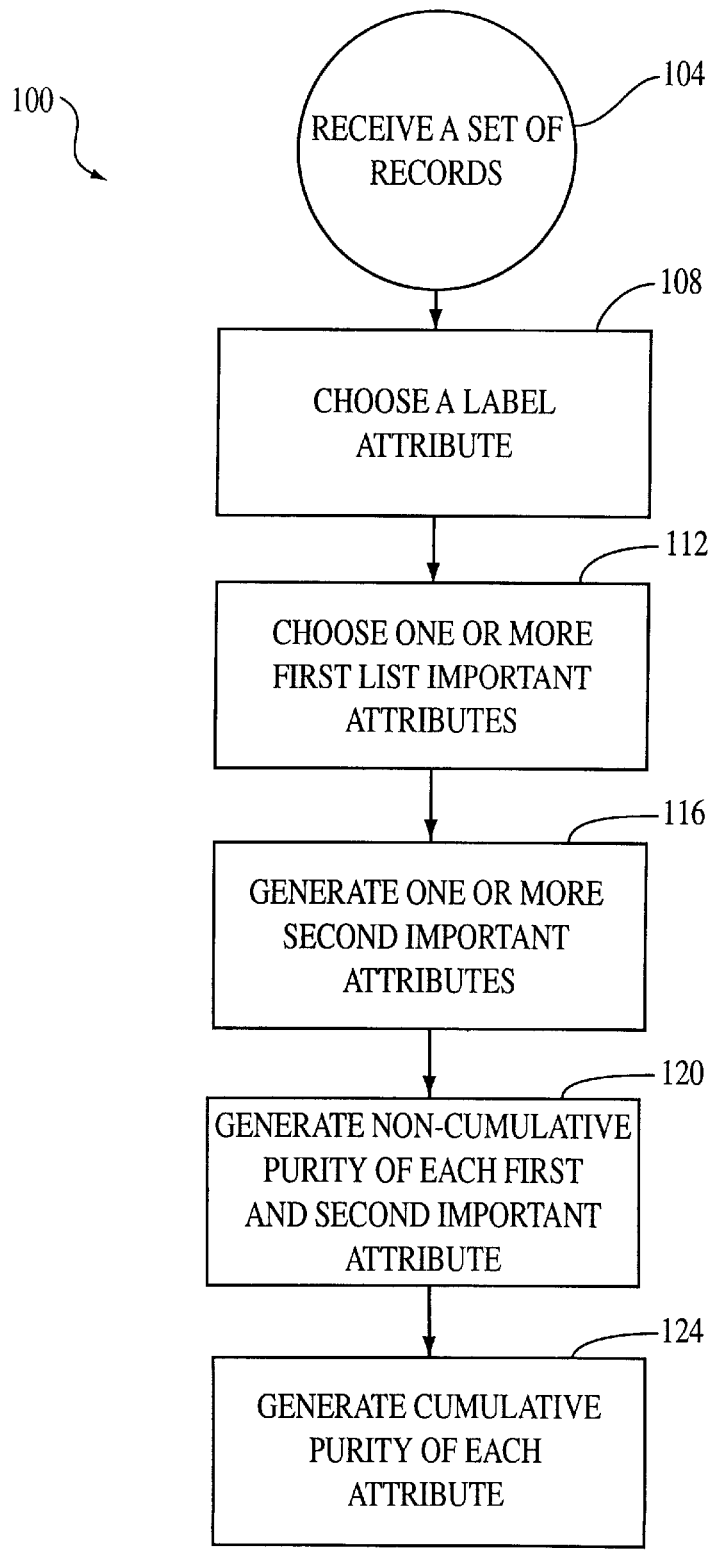
FIG. 1 is a flow diagram which illustrates a method for determining important attributes that discriminate between the different values of a chosen label attribute.

The present invention provides a system and a method for determining how well various attributes in a record discriminate different values of a chosen label attribute. An attribute is considered a relevant attribute if it discriminates different values of a chosen label attribute either alone or in conjunction with other attributes.

The present invention selects the relevant attributes which may provide insight or may be used as input for other methods, such as input to inducers, graphical programs, etc. Thus, attribute selection can help focus on a relevant subset of attributes while ignoring the irrelevant features. As described previously, this results in accurate predictions.

A measure called "purity" (a number from 0 to 100) informs how well each attribute discriminates the different label attributes. A purity of 100 indicates that an attribute perfectly discriminates the different label values in the record. Also, the purity measure allows the attributes to be ranked based on their importance.

Furthermore, additional important attributes are determined given one or more important attributes. In other words, one or more attributes that are considered important are pre-selected. The method then determines additional important attributes and adds them to the pre-selected important attributes.

Additionally, the cumulative purity of each important attribute together with the pre-selected (as input to the method) and previously determined (by the method itself) attributes in the list are computed. The cumulative purity indicates how well the total set of important attributes discriminate between the different values of the label attribute. Also, the non-cumulative purity of each attribute is determined. The non-cumulative purity indicates how well each important attribute individually discriminates between the different values of the chosen label attribute.

Moreover, the change in purity that each attribute adds to the attributes already determined to be important is computed. For example, a new attribute can be added to the list of important attributes. The incremental improvement in purity that the newly added attribute yields is computed. Also, the incremental improvement in purity of the remaining attributes is computed.

The present invention can be used to define a data set used to generate a splat visualization. For example, see U.S. patent application entitled "Method, System and Computer Program Product for Visually Approximating Scattered Data," application Ser. No. 08/782,809, filed on Jan. 13, 1997, and incorporated herein by reference in its entirety.

The present invention can also be used to define a data set used to generate a scatter visualization and a map visualization. For example, see U.S. patent application entitled "Computer-Related Method, System and Program Product for Controlling Data Visualization in External Dimension (s)," application Ser. No. 08/748,548, filed on Nov. 12, 1996, and incorporated herein by reference in its entirety.

The present invention can also be used to define a data set used to generate a tree visualization. For example, see U.S. patent application entitled "Method, System, and Computer Program Product for Visualizing Data Using Partial Hierarchies," application Ser. No. 08/813,347 (unofficial), Attorney Docket No. 15-4-103.0151, filed Mar. 7, 1997, and incorporated herein by reference in its entirety.

Furthermore, the present invention can be used to define a training set used to generate an evidence classifier or a decision-tree classifier. For example, see U.S. patent application entitled "Method, System, and Computer Program Product for Visualizing an Evidence Classifier," Attorney Docket No. 15-4-429.00, filed on Apr. 30, 1997, and incorporated herein by reference in its entirety. Also, see U.S. patent application entitled "Method, System and Computer Program Product for Visualizing a Decision Tree Classifier," application Ser. No. 08/813,336, filed on Mar. 7, 1997, and incorporated herein by reference in its entirety.

According to the present invention, a set of labeled records are received. Next, an oblivious decision tree (ODT) for classifying records is constructed. The construction of ODT is performed using mutual information (entropy) criteria. The mutual information criteria are used to select attributes conditioned on the previous ones. According to ODT, the same variables are selected for all combinations of other variables when computing purity of the attributes. For example, in a decision tree having a plurality of nodes, the present invention forces each test to be oblivious to the outcome of the previous test. In contrast, in a regular decision tree, a test performed on a record is dependent on the outcome of the previous test.

As stated previously, the construction of the ODT is performed using mutual information criteria. Instead of recursive partitioning, i.e., finding a split and constructing the subtree recursively, an iterative process is used. First, a test is selected with k outcomes that will be performed at all nodes in the current level of a tree. Next, the records are partitioned at each node p according to the test, and a new level comprising k nodes for each node p is created in the current level.

The method used to construct the ODT is presented below.

Input: A set of T labeled instances.
Output: An oblivious decision tree for classifying records.
  Each set created by this method has a corresponding node in a graph.
  1. S={T}
  //S is a set of records
  //t is a test conducted at all nodes with k outcomes in this level
  //find_split returns empty-split
  //to terminate
  2. while (t=find_split(S)) {
  3. S'={}
  4. for each s∈S{
  5. Split s into k sets according to the test t and add the sets to S'.
  6. For each of the k sets, create a node and connect to the node representing s. Label edge by the test outcome.
  7. } //end for each
  8. S=S'
  9. } //end while The find_split routine determines which split to conduct at all nodes at the current level, and decides when to terminate. While the test can be of any type, the present invention uses multi-way splits on nominal attributes (the test outcome is the attribute value) and threshold splits on continuous attributes. In order to determine which attribute to split on, and what threshold to pick for continuous attributes, mutual information is used. The mutual information is defined as a function of conditional entropies. The conditional entropy $H(Y|X_1, X_2 \ldots X_l)$ of the label Y, given attributes $X_1, X_2, \ldots X_l$, represents the amount of information about Y given the values of $X_1, X_2, \ldots X_l$ and is defined as:

$$H(Y|X_1, \ldots, X_l) = -\Sigma \Delta$$

$$\Delta = p(y, x_1, \ldots, x_l) \log(p(y|x_1, \ldots, x_l))$$

Given new attribute X, the mutual information is defined as the difference in the conditional entropies:

$$I(Y; X|X_1, \ldots, X_l) = H(Y|X_1, \ldots, X_l) - H(Y|X_1, \ldots, X_l, X)$$

If l is zero, the mutual information is defined as:

$$I(Y; X) = -\Sigma p(y) \log(p(y)) - H(Y|X)$$

As stated previously, the mutual information criteria are used to select attributes conditioned on the previous ones. The mutual information criteria includes a numerical value that indicates how well each attribute discriminates a chosen label attribute.

Because the mutual information is biased in favor of tests with many outcomes, the adjusted mutual information is defined as the mutual information divided by log k, where k is the number of outcomes for X. Given S, a set of records (each set of records is a node in the tree), the find_split routine checks all the possible attributes and determines the one that has the highest adjusted mutual information. For continuous attributes, a discretization process is performed. The basic step in the discretization process is to find the best threshold by searching all possible thresholds between two adjacent values of an attribute. Next, the best threshold split after the values for a given attribute have been sorted is computed in linear time in the number of records by shifting records from a left child node to a right child node as the threshold is increased.

FIG. 1 is a flow diagram 100 illustrating a method for determining the important attributes that discriminate between the different values of a chosen label attribute in a database. In a step 104, a set of records is received. Each record has a plurality of attributes. In a step 108, the label attribute is chosen. In a step 112, one or more first attributes that the user considers important are chosen. The first important attributes may include empty set of attributes (i.e., no attributes). In a step 116, one or more second important attributes are generated. The second important attributes together with the user chosen first important attributes best discriminate between the different values of the label attribute. In a step 120, non-cumulative purity of each first and second important attribute is generated. The non-cumulative purity indicates how well each important attribute individually discriminates between the different values of the label attribute. Finally, in a step 124, cumulative purity of each important attribute is generated. The cumulative purity indicates how well each important attribute in combination with all other important attributes discriminate between the different values of the label attribute.

Figure 2:
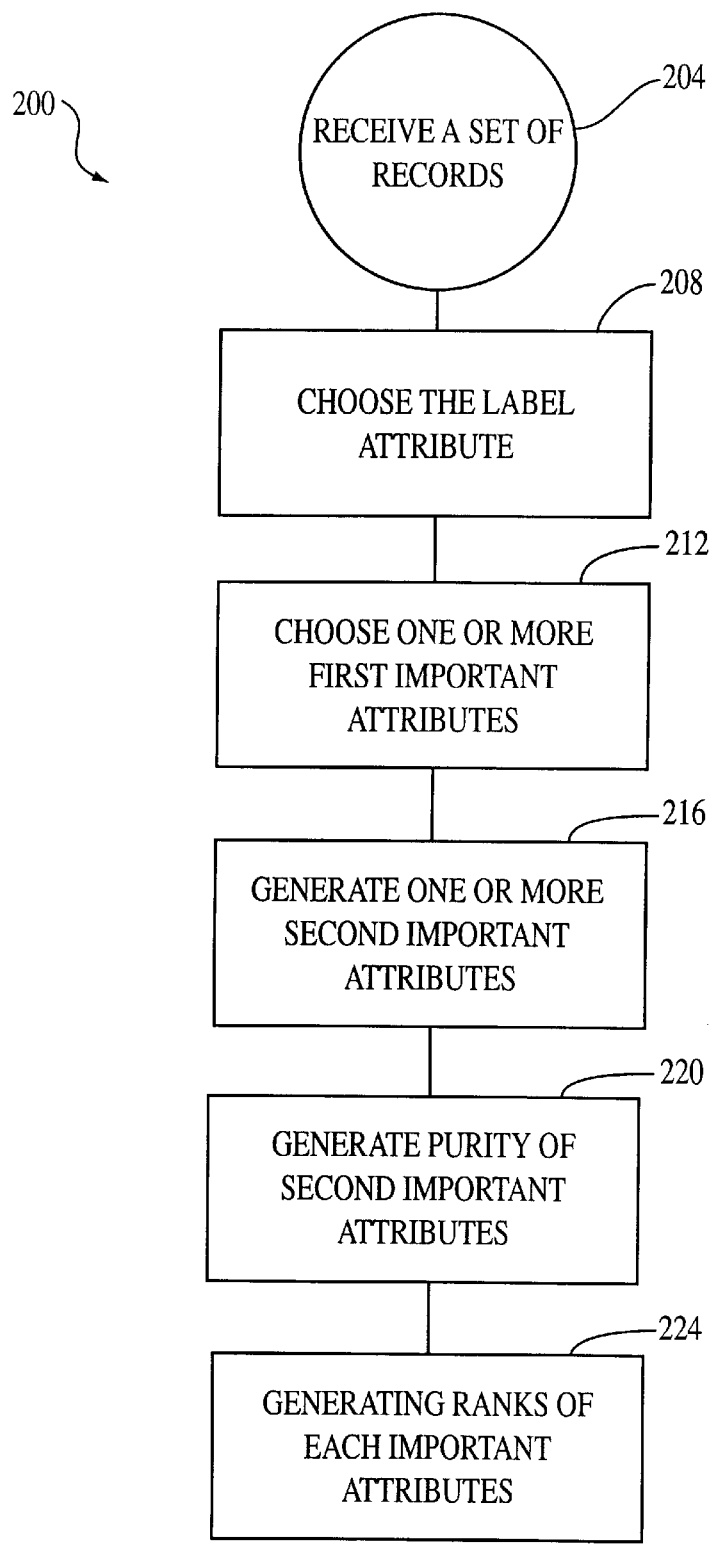
FIG. 2 is a flow diagram which illustrates the method for generating ranks of second important attributes.

FIG. 2 is flow diagram 200 illustrating the method for generating ranks of each second important attributes. In a step 204, a set of records is received. In a step 208, the label attribute is chosen. In a step 212, one or more first attributes that the user considers important are chosen. The first important attributes may include empty attributes. In a step 216, one or more second important attributes are generated. The second important attributes together with the user chosen first important attributes best discriminate between the different values of the label attribute. In a step 220, the purity of the second important attributes is generated. The purity indicates how well each second important attribute discriminates different values of the chosen label attribute. Finally, in a step 224, each second important attribute is ranked based on its purity.

Figure 3:
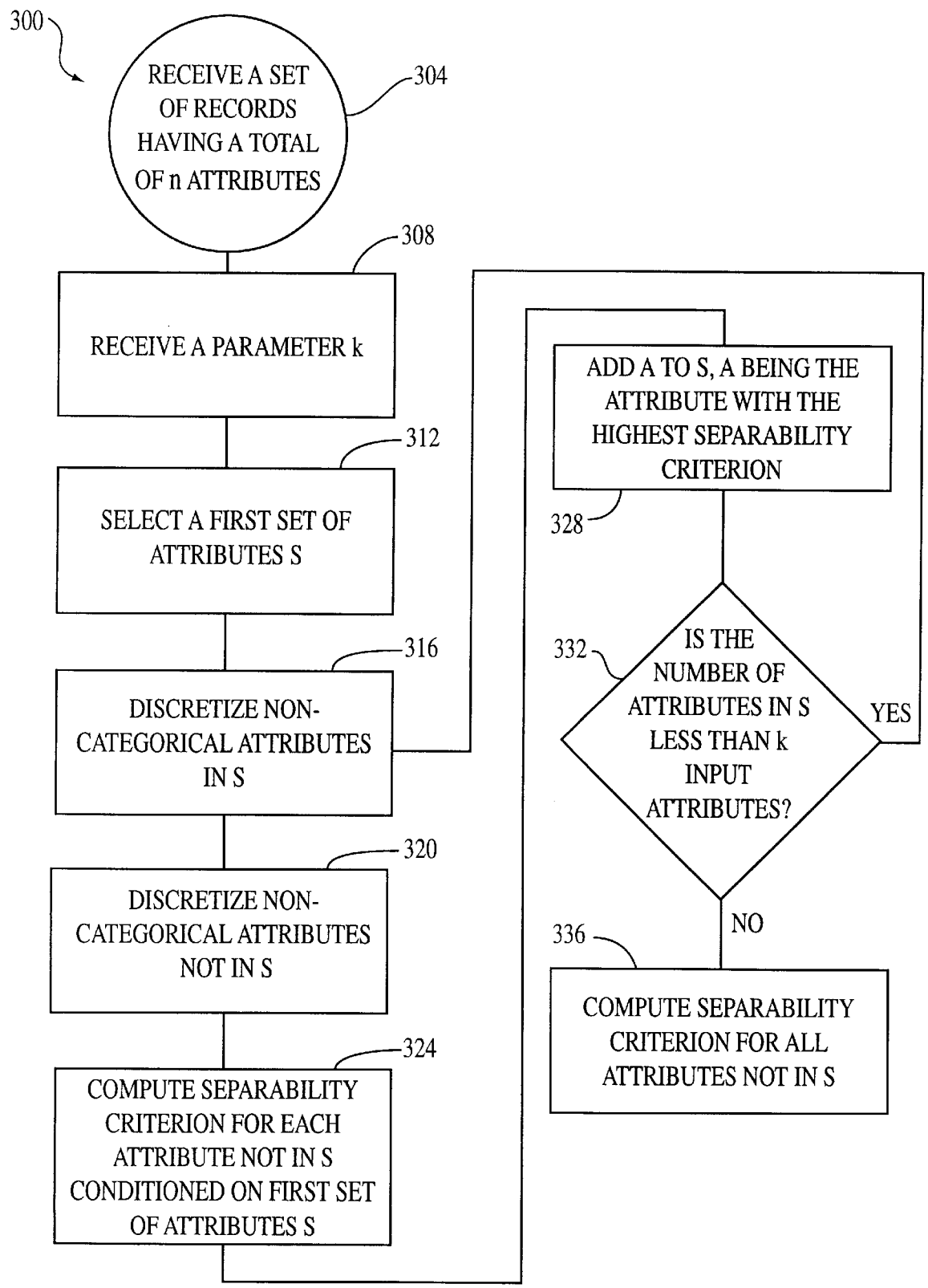
FIG. 3 is a flow diagram which illustrates the method for determining the most important attributes from a set of records in a database.

FIG. 3 is a flow diagram 300 which illustrates the method for determining the most important attributes from a set of records in a database. In a step 304, a set of records having a total of n attributes is received. In a step 308, a parameter k is received. The parameter k indicates the number of important attributes desired. In a step 312, a first set of attributes S is selected. In a step 316, non-categorical attributes in S are discretized. In a step 320, non-categorical attributes that are not in S are discretized. In a step 324, separability criterion is computed for each attribute not in S conditioned on first set of attributes S. In a step 328, attribute A is added to S. A is the attribute having the highest separability criterion. In a step 332, a test is performed to determine whether the number of attributes in S is less than k input attributes. If it is determined that the number of attributes in S is less than k input attributes, then the flow returns to step 316. Otherwise, the flow moves to a step 336 where separability criteria for all attributes not in S are computed.

The attribute selection method according to the present invention is much faster than the wrapper method discussed in the background section. For example, the present invention required 1 minute of execution time to select the 10 most important attributes in the DNA dataset. Recall that, the wrapper method required 29 hours of execution time to select the important attributes in the DNA dataset.

The present invention is implemented in MINESET™ which is a computer program product developed by Silicon Graphics Inc. The MINESET™ User's Guide, which accompanies the MINESET program, is herein incorporated by reference in its entirety. Specifically, chapter 11 of the MINESET User's Guide describes attribute selection. The present invention is also directed to a computer that is executing the software described herein. The present invention can be implemented in software, firmware, and/or hardware.

Figure 4:
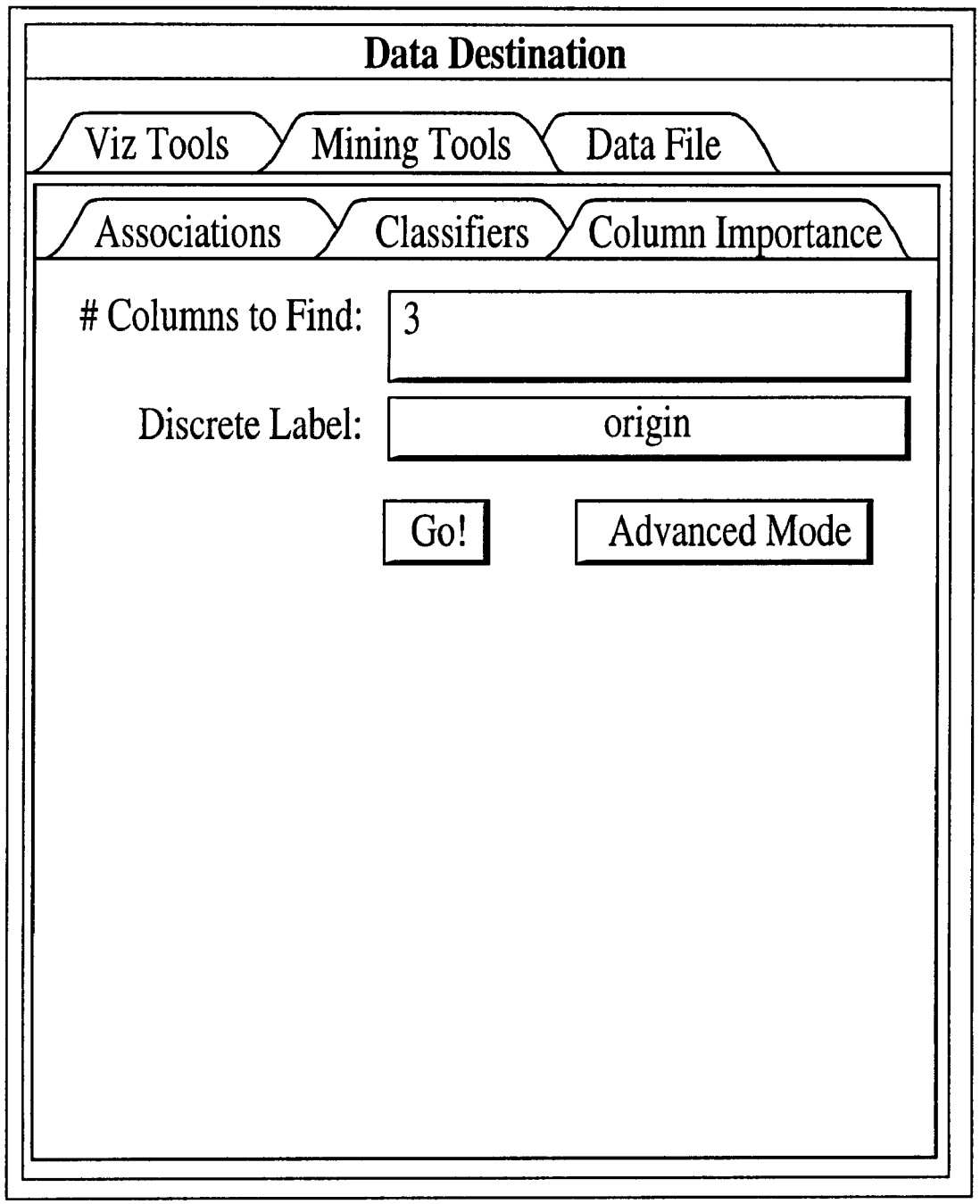
FIG. 4 is an attribute importance panel (referred as column importance panel) from the MINESET™ computer program product.

FIG. 4 is an attribute importance panel (also known as a column importance panel) from the MINESET™ computer program product, which is used to determine how important various columns (attributes and columns are used interchangeably) are in discriminating the different values of the chosen label column. A user might, for example, want to find the best three columns for discriminating the label good credit risk. When the user selects the label and clicks "Go!," a pop-up window appears with the three columns that are the best three discriminators. A measure called "purity" (a number from 0 to 100) informs the user how well the columns discriminate the different labels. Adding more columns increases the purity.

Figure 5:
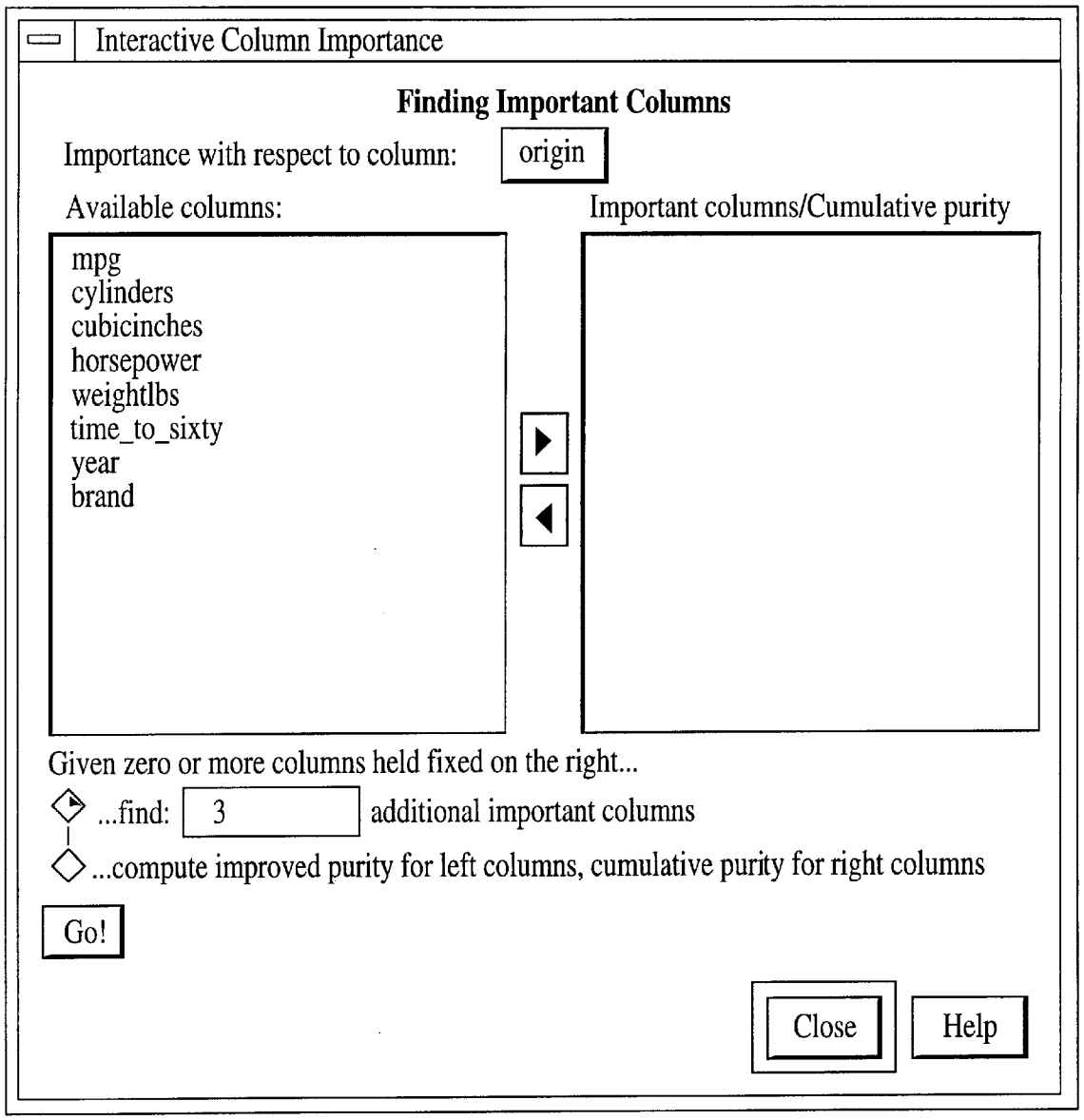
FIG. 5 is a panel in MINESET™ computer program product that shows two list columns.

There are two modes of column importance: (1) Simple Mode and (2) Advanced Mode. To invoke the Simple Mode, the user chooses a discrete label from the pop-up menu, and specifies the number of columns the user wants to see, then clicks "Go!." Advanced Mode lets a user control the choice of columns. To enter Advanced Mode, the user clicks "Advanced Mode" in the Column Importance panel. A dialog box appears, as shown in FIG. 5. The dialog box contains two lists of column names: the left list contains the available attributes and the right list contains attributes chosen as important (by either the user or the column importance algorithm).

Advanced Mode can work two different ways: (1) Finding Several New Important Attributes and (2) Computing Change in Purity.

(1) Finding Several Important Attributes: To enter this sub-mode, the user clicks the first of the two radio buttons at the bottom of the dialog. If the user clicks Go! with no further changes, the effect is the same as if the user were in Simple Mode, finding the specified number of important columns and automatically moving them to the right column. Near each column, the cumulative purity is given (i.e., the purity of all the columns up to and including the one on the line). More attributes increase purity.

Alternatively, by moving column names from the left list to the right list, the user can pre-select columns that the user wants included and lets the system add more. For example, to select the "cylinders" column and let the system find three more columns, the user clicks the "cylinders" column name, then clicks the right arrow between the lists.

Clicking Go! lets the user see the cumulative purity of each column, together with the previous ones in the list. A purity of 100 means that using the given columns, the user can perfectly discriminate the different label values in the dataset.

(2) Computing Change in Purity: Advanced Mode also lets the user compute the change in purity that each column would add to all those that were already marked important, that is, they are in the list on the right. For example, the user might move "cylinders" to the list on the right, and then ask the system to compute the incremental improvement in purity that each column remaining in the left column would yield. The cumulative purity is computed for columns on the right.

To enter this sub-mode, the user clicks on the second of the two radio buttons at the bottom of the dialog. This submode permits fine control over the process. If two columns are ranked very closely, the user might prefer one over the other (for example, because it is more reliable or easier to understand).

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for determining important attributes for discriminating between different values of a label attribute, the method comprising the steps of:

receiving a set of records, each record having a plurality of attributes;

permitting a user to choose the label attribute;

permitting a user to choose at least one first attribute that is considered important;

generating at least one second important attribute, said generated at least one second important attribute together with the said chosen at least one first important attribute discriminate well between the different values of the label attribute;

generating non-cumulative purity for each of said chosen at least one first important attribute and each of said generated at least one second important attribute, said non-cumulative purity indicating how well each first and second important attribute individually discriminates between different values of the label attribute; and generating cumulative purity for each of said chosen at least one first important attribute and each of said generated at least one second important attribute, said cumulative purity indicating how well a respective important attribute in combination with other first and second important attributes discriminates between different values of the label attribute.

2. The method according to claim 1, wherein said permitting a user to choose at least one first important attribute step comprises:

permitting a user to choose a first important attribute that is empty.

3. The method according to claim 1, wherein said permitting a user to choose the label attribute step further includes the steps of: displaying a panel;

permitting a user to input into said panel how many important attributes to generate; and permitting a user to select a label attribute from a list of important attributes in said panel.

4. The method according to claim 1, further comprising the step of:

permitting a user to select a simple mode or an advanced mode for selecting at least how many important attributes to generate.

5. The method according to claim 4, wherein said permitting a user to select an advanced mode step further comprises the steps of:

displaying an advanced panel;

displaying a list of important attributes in said advanced panel; and permitting a user to select whether to compute improved purity for left columns and cumulative purity for right columns in said advanced panel.

6. A method for determining important attributes for discriminating between the different values of a label attribute, the method comprising the steps of:

receiving a set of records, each record having a plurality of attributes;

permitting a user to choose the label attribute;

permitting a user to choose at least one first important attribute that is considered important;

generating at least one second important attribute, wherein each generated at least one second important attribute together with the said chosen at least one first important attribute discriminate better than at least one of the other attributes between the different values of the label attribute;

generating purity for said generated at least one second important attribute, said purity indicating how well each generated at least one second important attribute discriminates different values of the chosen label attribute; and generating rank of each said generated at least one second important attribute based on its purity.

7. The method according to claim 6, wherein said permitting a user to choose at least one first important attribute step comprises:

permitting a user to choose a first important attribute that is empty.

8. The method according to claim 6, wherein said permitting a user to choose the label attribute step further includes the steps of:

displaying a panel;

permitting a user to input into said panel how many important attributes to generate; and permitting a user to select a label attribute from a list of important attributes in said panel.

9. The method according to claim 6, further comprising the step of:

permitting a user to select a simple mode or an advanced mode for selecting at least how many important attributes to generate.

10. The method according to claim 9, wherein said permitting a user to select an advanced mode step further comprises the steps of:

displaying an advanced panel;

displaying a list of important attributes in said advanced panel; and permitting a user to select whether to generate purity for important attributes in said advanced panel.

11. The method according to claim 6, wherein said generating at least one second important attribute step comprises:

generating at least one second important attribute, wherein said generated at least one second important attributes together with the said chosen at least one first important attribute best discriminate between the different values of the label attribute.

12. The method according to claim 6, wherein said generating purity step comprises:

measuring said purity by a number from 0 to 100, with 0 indicating lowest purity and 100 indicating highest purity.

13. A method for determining the most important attributes from a set of records in a database, said most important attributes discriminate different values of a chosen label attribute, the method comprising the steps of:

(a) receiving a set of records having a total of n attributes;

(b) receiving a parameter k, said parameter k indicates number of important variables desired;

(c) selecting a first set of attributes S;

(d) discretizing non-categorical attributes in S;

(e) discretizing non-categorical attributes not in S;

(f) computing separability criterion for each attribute not in S conditioned on first set of attributes S;

(g) adding attribute A to S, A being the attribute with the highest separability criterion; and (h) if the number of attributes in S is less than k input attributes, returning to step (e), else, computing separability criteria for all attributes not in S.

14. A system for determining important attributes for discriminating between different values of a label attribute, comprising:

means for receiving a set of records, each record having a plurality of attributes;

means for permitting a user to choose the label attribute;

means for permitting a user to choose at least one first important attribute that is considered important;

means for generating at least one second important attribute, said generated at least one second important attribute together with the said chosen at least one first important attribute discriminate better than at least one of the other attributes between different values of the label attribute;

means for generating non-cumulative purity of each of said chosen at least one first attribute and each of said generated at least one second important attributes, said non-cumulative purity indicating how well each first and second important attribute individually discriminates between different values of the label attribute; and means for generating cumulative purity of each of said chosen at least one first important attribute and each of said generated at least one second important attribute, said cumulative purity indicates how well a respective important attribute in combination with all other first and second important attributes discriminates between different values of the label attribute.

15. The system according to claim 14, wherein said at least one first important attribute is empty.

16. The system according to claim 14, wherein said means for permitting a user to choose the label attribute further includes a graphical user interface, wherein said graphical user interface comprises:

means for permitting a user to select a simple mode.

17. The system according to claim 14, wherein said means for permitting a user to choose the label attribute further includes a graphical user interface, wherein said graphical user interface comprises:

means for permitting a user to select an advanced mode;

means for displaying a list of important attributes;

means for permitting a user to select important attributes;

means for permitting a user to select the number of important attributes to generate; and means for permitting a user to select whether to compute improved purity for left columns and cumulative purity for right columns.

18. The system according to claim 14, wherein said means for generating at least one second important attribute comprises:

means for generating at least one second important attribute, wherein said generated at least one second important attributes together with the said chosen at least one first important attribute best discriminate between the different values of the label attribute.

19. A system for determining important attributes for discriminating between different values of a label attribute, comprising:

means for receiving a set of records, each record having a plurality of attributes;

means for permitting a user to choose the label attribute;

means for permitting a user to choose at least one first important attribute that is considered important;

means for generating at least one second important attribute, wherein each generated at least one second important attribute together with the said chosen at least one first important attribute discriminate better than at least one of the other attributes between the different values of the label attribute;

means for generating purity for said generated at least one second important attribute, said purity indicating how well each generated at least one second important attribute discriminates different values of the chosen label attribute; and means for generating rank of each said generated at least one second important attribute based on its purity.

20. The system according to claim 19, wherein said chosen at least one first important attribute is empty.

21. The system according to claim 19, wherein said means for permitting a user to choose the label attribute further includes a graphical user interface, wherein said graphical user interface comprises:

means for permitting a user to select a simple mode.

22. The system according to claim 19, wherein said means for permitting a user to choose the label attribute further includes a graphical user interface, wherein said graphical user interface comprises:

means for permitting a user to select an advanced mode;

means for displaying a list of important attributes;

means for permitting a user to select important attributes;

means for permitting a user to select the number of important attributes to generate; and means for permitting a user to select whether to compute improved purity for left columns and cumulative purity for right columns.

23. The system according to claim 19, wherein said means for generating at least one second important attribute comprises:

means for generating at least one second important attribute, wherein said generated at least one second important attributes together with the said chosen at least one first important attribute best discriminate between the different values of the label attribute.

24. The system according to claim 19, wherein said means for generating purity comprises:

means for measuring said purity by a number from 0 to 100, with 0 indicating lowest purity and 100 indicating highest purity.

25. A system for determining the most important attributes from a set of records in a database, said most important attributes discriminate different values of a chosen label attribute, comprising:

(a) means for receiving a set of records having a total of n attributes;

(b) means for receiving a parameter k, said parameter k indicates number of important variables desired;

(c) means for selecting a first set of attributes S;

(d) means for discretizing non-categorical attributes in S;

(e) means for discretizing non-categorical attributes not in S;

(f) means for computing separability criterion for each attribute not in S conditioned on first set of attributes S;

(g) means for adding attribute A to S, A being the attribute with the highest separability criterion;

(h) means for returning to step (e), if the number of attributes in S is less than k input attributes; and (g) means for computing separability criteria for all attributes not in S.

26. A computer program product for determining important attributes for discriminating between different values of a label attribute, comprising:

means for receiving a set of records, each record having a plurality of attributes;

means for permitting a user to choose the label attribute;

means for permitting a user to choose at least one first important attribute that is considered important;

means for generating at least one second important attribute, said generated at least one second important attribute together with the said chosen at least one first important attribute discriminate better than at least one of the other attributes between different values of the label attribute;

means for generating non-cumulative purity of each of said chosen at least one first attribute and each of said generated at least one second important attributes, said non-cumulative purity indicating how well each first and second important attribute individually discriminates between different values of the label attribute; and means for generating cumulative purity of each of said chosen at least one first important attribute and each of said generated at least one second important attribute, said cumulative purity indicates how well a respective important attribute in combination with all other first and second important attributes discriminates between different values of the label attribute.

27. The computer program product according to claim 26, wherein said chosen at least one first important attribute is empty.

28. The computer program product according to claim 26, wherein said means for permitting a user to choose the label attribute further includes a graphical user interface, wherein said graphical user interface comprises:

means for permitting a user to select a simple mode.

29. The computer program product according to claim 26, wherein said means for permitting a user to choose the label attribute further includes a graphical user interface, wherein said graphical user interface comprises:

means for permitting a user to select an advanced mode;

means for displaying a list of important attributes;

means for permitting a user to select important attributes;

means for permitting a user to select the number of important attributes to generate; and means for permitting a user to select whether to compute improved purity for left columns and cumulative purity for right columns.

30. The computer program product according to claim 26, wherein said means for generating at least one second important attribute comprises:

means for generating at least one second important attribute, wherein said generated at least one second important attributes together with the said chosen at least one first important attribute best discriminate between the different values of the label attribute.

* * * * *

UNITED STATES PATENT AND TRADEMARK OFFICE
CERTIFICATE OF CORRECTION

PATENT NO. : 6,026,399
DATED : February 15, 2000
INVENTOR(S) : Kohavi et al.

It is certified that error appears in the above-identified patent and that said Letters Patent is hereby corrected as shown below:

<u>Column 12,</u>
Line 55, please replace "(g)" with -- (i) --.

Signed and Sealed this

Second Day of April, 2002

Attest:

*Attesting Officer*

JAMES E. ROGAN
*Director of the United States Patent and Trademark Office*